Nov. 6, 1951   H. HEIMANN   2,574,034

SELF-LOCKING RETAINING RING

Filed Aug. 30, 1949

Inventor:

HEINRICH HEIMANN,

By  J. Harold Kilcoyne
   Attorney

UNITED STATES PATENT OFFICE 2,574,034

SELF-LOCKING RETAINING RING

Heinrich Heimann, New York, N. Y., assignor to Waldes Koh-I-Noor, Inc., Long Island City, N. Y., a corporation of New York Application August 30, 1949, Serial No. 113,177

3 Claims. (Cl. 85—8.8)

This invention relates to improvements in self-locking retaining rings of the type providing an artificial locating shoulder on a shaft or in the bore of a housing, and is more particularly concerned with the provision of an improved self-locking retaining ring characterized by open-end or so called split ring construction.

Known self-locking retaining rings comprise a closed ring body of tempered spring steel provided with radial prongs extending inwardly for the external ring and outwardly for the internal ring from the ring body by a slight angle. Such rings are shiftable over the shaft or into the housing bore in one direction only, i. e. in direction which tends to increase the inclination of the prongs. When thrust forces in the opposite direction are applied to the ring, the prongs tend to straighten out, with the result that their free ends press or bite into the material of the shaft or bore surface to provide a self-locking action preventing the ring from being shifted axially even under considerable thrust loads exerted on the ring as by a machine part located thereby. Depending on the size of the ring, the thickness of the ring material, the length of the prongs, and/or the shearing strength of the surface material of the shaft or housing, the thrust capacity of such a ring can reach several hundred pounds. Therefore, rings of the aforesaid self-locking type form very useful shoulders in installations wherein they are subject to moderate thrust loads and vibrations and they possess the further advantage that they do not require the grooving of shaft or housing.

However, the range of application of such locking rings is limited somewhat by the fact that when locking under thrust loads, the freed edges of the locking prongs are pressed into the surface material of shaft or housing, causing damage to or marring of the material not permissible in precision installations. Again, whereas a particular installation may call for assembly in both directions, assembly of the self-locking closed ring as aforesaid is possible in one direction only. Moreover, a closed self-locking ring is open to the objection that, because of its self-locking action, its removal from shaft or housing is impossible without the ring taking on a permanent set or its usefulness being destroyed unless special complicated tools capable of lifting the ring from its locked engagement with shaft or housing are provided.

Now, there are many potential retaining ring applications, in which the ring need have only a relatively low capacity to withstand thrust loads and/or vibrations, provided a satisfactory design of ring is made available; examples of such applications being light machinery such as typewriters, calculating machines, business machines, et cetera. In such machinery, it is common practice to employ closed stop collars having slide fit relatively to shaft or housing, so that they can be shifted easily into position and thereupon locked with a set screw. Such stop collars cannot be replaced, either by conventional open-ended retaining rings which require a groove, because of the small size of shaft, or by the self-locking closed rings as described, because the latter can be assembled in one direction only. Yet the stop collars commonly employed require relatively high machining costs, high labor cost in assembly and disassembly and have the further disadvantage that the set screws which secure them are liable to work loose even under slight vibrations, with the result that the collars are unable to perform their function as stop collars.

Broadly stated, it is an object of this invention to overcome the objections and disadvantages set forth above for self-locking closed rings and for stop collars, through the provision of a retaining ring of the open-ended or split type which is stamped from spring metal and is capable of being spread or contracted and thereupon shifted axially along the shaft or into a housing bore, respectively, in either direction to desired position, as with conventional open-ended retaining rings, and which when released will clamp itself to the outer surface of the shaft, or the inner surface of the housing, with a friction pressure that exceeds the forces likely to be exerted on the ring by thrusts or vibrations, without any requirements for grooving the shaft or housing.

More particularly, the invention contemplates and aims to provide an open-ended spring retaining ring which is so constructed as to deform circularly and which is moreover capable, through its specialized design, of clamping itself when stressed, i. e. spread over a shaft or contracted into a housing bore, to the surface of the shaft or housing bore through the friction force exerted by its own pressure against said surface in tending to return to its free or unstressed state.

Another object of the invention is the provision of a tapered retaining ring capable of clamping itself to the surface of a shaft or housing bore as aforesaid, wherein the dimensions of the ring are so chosen that when the ring is spread over a shaft or contracted into a housing bore and subsequently released, it will exert enough pressure thereon as to create frictional holding forces comparable to those exerted by a conventional stop collar of corresponding size secured by a set screw.

A still further object of the invention is the provision of a tapered clamping ring as aforesaid, characterized by a prescribed dimensioning of height of ring middle section in relation to free ring diameter, and a chosen degree of spreading or contraction, which are such as to insure adequate clamping pressure, as well as a spreading or contracting force which can easily be governed by pliers, the latter feature being of advantage in facilitating assembly and disassembly of the ring on its shaft or in a housing bore.

The above and other objects and features of advantage of the improved self-locking retaining of the invention will be apparent from the following detailed description, taken with the accompanying drawing illustrating variant forms which a ring of the invention may take, in which—

Figure 1:
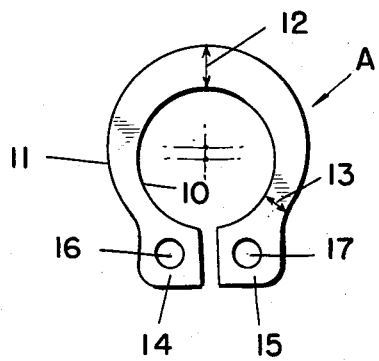
Fig. 1 is a plan view of an external self-locking ring in its free or unstressed state.

In the following, the open-ended self-locking retaining ring of the invention will be described in its application to light machinery, such as typewriters, calculating and business machines, et cetera (although it is not intended to be so limited), wherein stop collars secured with a set screw were employed previously. To ascertain the correct dimensions of a tapered ring, i. e. a ring having section heights diminishing from the middle section to the free ends thereof, which when spread over a shaft or contracted into a housing bore and subsequently released, will exert sufficient pressure to create friction forces comparable to those of a stop collar of comparable size, it is necessary to establish a general relationship between the degree of spreading and contracting; the ratio $$\frac{\text{Neutral or free diameter}}{\text{Maximum section height}}$$

and the ratio $$\frac{\text{Maximum working stress}}{\text{Modulus of elasticity}}$$

Starting with the well known bending equation for a curved beam, $$\frac{1}{r}-\frac{1}{R}=\frac{M}{EI}$$

wherein $r$ is the initial radius of curvature; $R$ the changed radius of curvature (after bending); $M$ the bending moment; $I$ the moment of inertia; and $E$ the modulus of elasticity.

If we assume that the ring is tapered from its middle section to its free ends so that it deforms circularly under all spreading or contracting conditions not exceeding the yield strength of the material, the general bending formula above may be transformed to the case of the tapered ring as follows:

$$\frac{p}{1+p}=\frac{Mr}{EI} \text{ (external ring)}$$

and $$\frac{p}{1-p}=\frac{Mr}{EI}$$

In this formula, $p$ is the percentage of spreading (unit change) of the diameter of the neutral (free) ring circle, and, consequently, $R=(1+p)r$ for the external ring and $(1-p)r$ for the internal ring.

In the translated bending formula above, we now substitute further for the bending moment $M$, as follows:

$$M=\frac{s.I}{c}=\frac{2sI}{h}$$

wherein the first ratio is well known in stress analysis, i. e., bending moment=maximum working stress times inertia moment, divided by distance $c$ of outermost fibre from neutral axis, and wherein, in the second ratio, $h$=the maximum section height of the ring. For rings having rectangular section, as the present rings, the distance from the neutral axis is ½ the section height, or $$c=\frac{h}{2}$$

from which the second ratio derives.

There results the following formula for external rings:

$$\frac{p}{1+p}=\frac{s}{E}\cdot\frac{D}{h}$$

The last above formulae allow a very simple dimensioning of the ratio $$\frac{\text{Neutral ring diameter}}{\text{Maximum section height}}$$

depending on a chosen unit change of ring diameter through spreading or contraction, under the assumption that the maximum working stress does not exceed the yield strength. In practical application, this means that for high tempered steel, the ratio $s/E$ would be approximately $$\frac{300,000}{30,000,000} \text{ or } \frac{1}{100}$$

According to the invention, the unit change of ring diameter with spreading or contracting has been chosen as approximately .04 (or 4%), and in no case exceeding 5%, as a basis for ring dimensioning for two reasons: First, even for very small rings, for example, for rings to be assembled on a $\frac{3}{16}''$ shaft, the degree of spreading at the ring lugs under the condition of 4% diameter change would be approximately .12 D, or, for the example of a $\frac{3}{16}''$ shaft, .022'', an amount that can easily be governed with pliers. Secondly, the same dimensioning leads to a force on the plier handles which is within the normal force exerted by hand for spreading a ring on a shaft of four times that diameter, namely, a ¾'' shaft.

Now, taking the ratio $p$ of spreading or contracting the ring to be .04 for the above reasons, the formula for the relation between the height $(h)$ of the middle section to free diameter $(D)$, which latter is the inner diameter of the external ring and the outer diameter of the internal ring, may be read as follows:

$$\frac{.04}{1.04}=\frac{300,000}{30,000,000}\times\frac{D}{h}$$

Solution of this equation discloses that $$\frac{D}{h} = 4$$

In other words, the section height of the ring should be approximately ¼ of the free ring diameter, for both the external ring and internal ring.

It will be observed that the formulas developed above for both external and internal rings show the ratio $D/h$ to be approximately proportional to $p$. Practically, this shows that with decreasing degree of spreading or contracting, the section height $h$ of the ring may be proportionally increased.

The second equation which now has to be evaluated for calculating the maximum pressure the ring can exert on the surface of shaft or housing is $$M = \frac{2sI}{h}$$

or, for a ring of rectangular section, $$M = \frac{sth^2}{6}$$

wherein $t$ is the material thickness, which for reasonable length of life of the die employed in stamping out such rings from spring metal must not exceed the smallest section height of the ring, and $h$ the maximum section height as used in the formula for spreading or contracting. This equation shows that the bending moment $M$ increases with the square of the maximum section height. Considering that the total radial pressure of the ring against the surface of shaft or housing bore equals $$\frac{2M}{r}$$

it follows that this pressure increases also with the square of the section height of the ring, and as the friction hold of the ring is a direct function of pressure, so also does the friction hold increase.

Figure 2:
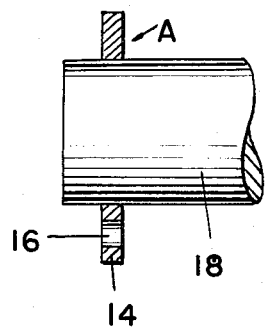
Fig. 2 is a cross section showing the same ring spread over a shaft.

Referring now to the drawings illustrating a self-locking, open-ended retaining ring designed in accordance with above, Figures 1 and 2 illustrate an external self-locking ring A of the open-ended or split type, the ring being stamped from spring metal and having an inner circular edge 10 and an outer circular edge 11, said edges being eccentric to one another so that the section heights of the ring decrease from the middle section 12 to minimum section height 13 near the free ends of the ring, said minimum section height being approximately one-half the height of the middle section 12 and at least equal to the axial thickness of the ring body, as is conventional in prior open-ended retaining rings of the type adapted to be set into a shaft groove. Said free ends are formed as lugs or ears 14, 15, having apertures 16, 17 respectively for the insertion of the working points of pliers by which the ring may be spread over a shaft to a degree necessary for producing, in the middle section 12 of maximum section height, a working stress approaching the yield strength of the material from which the ring is made, i. e., tempered spring steel.

According to the invention, the height of the ring middle section 12 is approximately one quarter, but not less than one quarter, of the inner diameter of the ring, i. e. the diameter of the inner circular edge 10 in the unstressed state of the ring. Under this condition, the yield strength of the material, as explained in the introductory analysis, is reached when the degree of spreading in diameter direction approaches 4%. Then the holding force of the ring against axial displacement for a friction co-efficient of .15 (a reasonable assumption for friction of metal on metal) is 1.5 times the force required to be exerted on the handles of the pliers to spread the ring about 4%. If, for instance, this force is 12 to 16 pounds for small rings, the holding force of the ring against axial displacement is approximately 18 to 24 pounds. This holding force is, in small installations as on the ⅛" shaft of a typewriter which locates the paper guide rolls or similar parts, for example, amply sufficient so that a ring according to the invention may be used instead of the well known collars secured by set screws which are apt to shake loose in service.

In Figure 2 ring A is shown to be spread over a shaft 18 having diameter about 4% larger than the inner edge 10 of the ring over which it has been shifted and subsequently released. The inner ring edge 10 grips shaft 18 all around with a large force due to the circular deformation of the ring resulting from its taper and to the special dimensions as described in the present specification.

Figure 3:
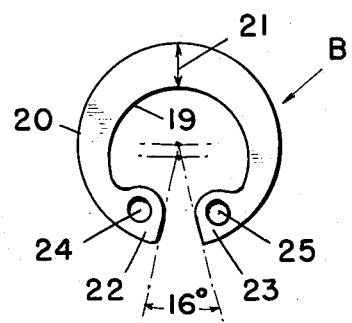
Fig. 3 is a plan view of an internal ring in its free or unstressed state.

The internal self-locking ring B (Fig. 3) has eccentrically arranged inner and outer circular edges 19 and 20 respectively. The height of middle section 21 is approximately one quarter of the free diameter of outer circular edge 20. At its free ends the ring B is provided with lugs 22, 23 having apertures 24, 25, respectively, for inserting pliers to contract the ring in assembly or disassembly and for producing the requisite working stress in its middle section when contracted in its housing bore. The gap angle, i. e. the angle between the free ends, is so chosen (about 16°) that, when the ring is contracted until the edges of the lugs meet, the contraction is in the neighborhood of 4% of the free ring diameter. In a so dimensioned ring, the holding force of the ring when the latter is sprung into a housing of corresponding diameter is about 1.5 times the force exerted with pliers on the ring ends.

Figure 4:
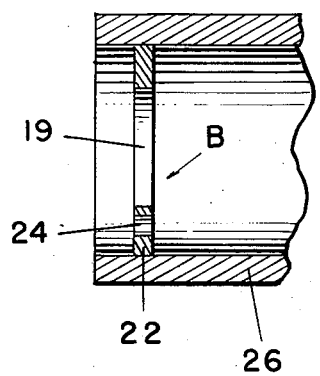
Fig. 4 is a cross section of a ring according to Fig. 3 contracted in a housing.

In Fig. 4, the ring B is shown to be sprung into a housing 26 whose bore has a diameter about 4% smaller than the diameter of the free outer circle 20. Thus the ring outer edge 20 grips the material of the housing bore throughout its full arcuate length, due to its tapered construction which insures circular deformation and special design as aforesaid.

Figure 5:
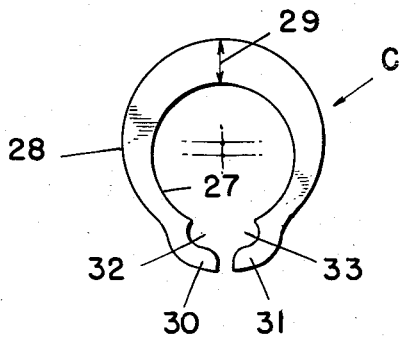
Fig. 5 is a plan view of an external ring with modified lugs or ears.

In Fig. 5, the external ring C is defined by an inner circular edge 27 and an eccentrically arranged outer circular edge 28. The height of the middle section 29 is again approximately one quarter of the diameter of inner circle 27. In this embodiment lugs 30, 31 are provided with facing recesses 32, 33 instead of apertures for the insertion of pliers. This modified form of lug allows a smaller radial height of the lugs and, therefore, a certain decrease of the so-called clearance diameter of the ring, i. e. the diameter of a circle concentric to the inner ring circle and contacting the outermost points of the lugs.

Without further analysis, it will be seen that self-locking retaining rings as described achieve the objectives of this invention as set forth above. More particularly, the invention provides a self-locking retaining ring having the conventional form of an open-ended retaining ring of the type heretofore used only in connection with a grooved shaft or housing bore groove, and accordingly possesses the advantage of such a ring in ease of assembly and disassembly. As distinguished from the conventional ring, however, the present ring requires no seating groove, but on the other hand clamps the surface of shaft or housing bore with a pressure sufficient to create a high friction gripping force, which is adequate to hold the ring in position against thrust loads or vibrations encountered or likely to be encountered in lightweight machinery.

Although the invention has been described on the basis of a ring assumed to taper from its middle section to its free ends so that it deforms circularly under the spreading and contracting condition encountered in its use, it is to be understood that a similar clamping effect of ring on shaft can be obtained with rings of uniform section height, although the latter type ring may have only point contact with the shaft.

Accordingly, as many changes could be made in carrying out the above constructions without departing from the scope of the invention, it is intended that all matter contained in the above description or shown in the accompanying drawings shall be interpreted as illustrative and not in a limiting sense.

I claim:

1. A self-locking retaining ring adapted to form a locating shoulder on a carrying member for securing a machine part against axial displacement and which is adapted to secure itself to the surface of said member solely by its friction grip thereon, comprising an open-ended ring body stamped from spring metal having section heights which diminish continuously from the ring middle section towards the free ends thereof, whereby it is adapted to maintain circularity in deformation, the height of the middle section being approximately one-fourth of the free diameter of the circle of the ring edge which friction-grips said surface, the height of the smallest section being approximately one-half that of the middle section and at least equal to the ring-thickness, the free ends of the ring body being provided with protruding lugs for receiving the working points of pliers, said ring body being adapted to be deformed radially by said pliers within the elasticity range of the spring metal an amount not exceeding 5% of its aforesaid free diameter.

2. A self-locking retaining ring as set forth in claim 1, wherein the ring body is adapted to be spread radially outwardly and its inner edge provides the friction-gripping edge.

3. A self-locking retaining ring as set forth in claim 1, wherein the ring body is adapted to be contracted radially and its outer edge provides the friction-gripping edge.

HEINRICH HEIMANN.

REFERENCES CITED

The following references are of record in the file of this patent:

UNITED STATES PATENTS

| Number | Name | Date |
|---|---|---|
| Re. 18,144 | Heiermann | May 13, 1930 |
| 1,119,299 | Martin | Dec. 1, 1914 |
| 1,675,277 | Roe | June 26, 1928 |
| 2,240,425 | Sternberg | Apr. 29, 1941 |
| 2,243,688 | Trollen | May 27, 1941 |
| 2,322,949 | Lux | June 29, 1943 |
| 2,491,310 | Heimann | Dec. 13, 1949 |

FOREIGN PATENTS

| Number | Country | Date |
|---|---|---|
| 145,943 | Great Britain | July 8, 1920 |
| 444,882 | Germany | May 27, 1927 |
| 785,957 | France | Aug. 23, 1935 |
| 233,427 | Switzerland | Oct. 16, 1944 |